(12) United States Patent
Read

(10) Patent No.: US 7,147,967 B1
(45) Date of Patent: Dec. 12, 2006

(54) CATHODE FOR METAL-OXYGEN BATTERY

(75) Inventor: Jeffrey A. Read, West Friendship, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 325 days.

(21) Appl. No.: 10/628,435

(22) Filed: Jul. 29, 2003

(51) Int. Cl.
*H01M 4/62* (2006.01)
*H01M 4/48* (2006.01)
*H01M 4/50* (2006.01)
*H01M 4/58* (2006.01)

(52) U.S. Cl. ............... 429/217; 429/221; 429/223; 429/224; 429/231.1; 429/231.3; 429/231.5; 429/232

(58) Field of Classification Search ............ 429/44, 429/221, 223, 224, 231.1, 231, 231.4, 231.5, 429/231.8, 232, 231.3
See application file for complete search history.

(56) References Cited

U.S. PATENT DOCUMENTS

| | | | |
|---|---|---|---|
| 3,948,684 A | 4/1976 | Armstrong | 136/120 FC |
| 4,246,253 A | 1/1981 | Hunter | 423/605 |
| 5,482,797 A * | 1/1996 | Yamada et al. | 429/221 |
| 5,491,041 A | 2/1996 | Abraham et al. | 429/212 |
| 5,510,209 A | 4/1996 | Abraham et al. | 429/192 |
| 5,626,985 A * | 5/1997 | Shoji et al. | 429/332 |
| 6,053,953 A * | 4/2000 | Tomiyama et al. | 429/231.95 X |
| 6,322,744 B1 * | 11/2001 | Kelley et al. | 264/446 |
| 6,368,365 B1 | 4/2002 | Chi et al. | 29/623.1 |
| 6,372,370 B1 | 4/2002 | Kaplan et al. | 429/27 |
| 6,558,846 B1 * | 5/2003 | Tsushima et al. | 429/231.8 |
| 6,593,023 B1 * | 7/2003 | Chang et al. | 429/44 |
| 2002/0081495 A1 | 6/2002 | Nakojima et al. | 429/231.3 |
| 2003/0087160 A1 | 5/2003 | Suzuki et al. | 429/327 |

OTHER PUBLICATIONS

Read, J. Journal of The Electrochemical Society, 149 (9) A1190-A1195 (2002), no month.
Abraham, K.M. and Jiang, Z. Journal of The Electrochemical Society, 143, 1 (Jan. 1996).

* cited by examiner

*Primary Examiner*—Stephen J. Kalafut
(74) *Attorney, Agent, or Firm*—William V. Adams

(57) ABSTRACT

Disclosed is a cathode material for a metal-oxygen battery such as a lithium-oxygen battery. The material comprises, on a weight basis, a first component which is an oxide or a sulfide of a metal. The first component is capable of intercalating lithium, and is present in an amount which is greater than 20% and up to 80% of the material. The material includes a second component which comprises carbon. The carbon is an electroactive catalyst which is capable of reducing oxygen, and comprises 10–80% of the material. The material further includes a binder, such as a fluoropolymer binder, which is present in an amount of 5–40%. Also disclosed is a battery which incorporates the cathode material.

13 Claims, 2 Drawing Sheets

CATHODE FOR METAL-OXYGEN BATTERY

GOVERNMENT INTEREST

The invention described herein may be manufactured, used, and licensed by or for the United States Government.

FIELD OF THE INVENTION

This invention relates generally to electrochemical devices such as batteries. More specifically, the invention relates to cathodes for metal-oxygen batteries; and most specifically it relates to cathodes for lithium-oxygen batteries.

BACKGROUND OF THE INVENTION

Metal-oxygen batteries, which are also referred to as metal-air batteries, are a class of electrochemical cells in which oxygen, which is typically obtained from the ambient environment, is reduced at a catalytic cathode surface as part of the electrochemical cell reaction. Reduction of the oxygen forms an oxide or peroxide ion which reacts with a cationic metal species. Metal-oxygen batteries have been developed based upon Fe, Zn, Al, Mg, Ca, and Li. It is acknowledged that in the strictest sense a "battery" is an electrochemical device comprised of a number of separate electrochemical cells interconnected to a single set of terminals to provide an output which is cumulative in terms of voltage and/or current of each of the individual cells. However, for purposes of the present disclosure, and in keeping with vernacular terminology, the term "battery" will be used herein to define electrochemical power generation and/or storage devices comprised of single cells as well as plural, interconnected cells.

Lithium-oxygen batteries represent one type of metal-oxygen battery. In devices of this type, an electro-active cathode and a lithium-containing anode are disposed in an electrolyte which provides for ionic communication therebetween. During the discharge of the cell, oxygen is reduced at the electro-active cathode to produce $O^{-2}$ and/or $O_2^{-2}$ ions which react with the lithium to produce $Li_2O_2$ and/or $Li_2O$ which deposits on the cathode. Such cells provide an operating voltage in the typical range of 2.0–2.8 V, and an open circuit voltage of 2.85 V, and they have a good charge storage capacity, typically on the order of 1500–2000 mAh/g. However, the reduction of $O_2$ and the deposition of $Li_2O_2$ or $Li_2O$ is relatively slow. Hence, the discharge and charge rate of batteries of this type is relatively low, which limits their use in particular applications.

In another type of lithium battery, the cathode thereof is fabricated from a crystalline or semi-crystalline material which is capable of intercalating lithium into the lattice structure thereof during the discharge cycle. The intercalation reaction is a fast process that allows the cathode to discharge at a high rate, but the capacity of such electrode materials to intercalate lithium is typically limited to about 120–250 mAh/g. Hence, batteries of this type are relatively large as compared to comparable batteries employing cathodes which reduce oxygen.

The present invention provides a hybrid battery cathode which combines materials which intercalate lithium or other metals along with materials which can reduce oxygen so as to allow the battery to also operate in a metal-oxygen mode. Batteries of the present invention combine high charge and discharge rate capabilities together with good charge storage capacity. While various of the materials employed in the present invention have been utilized, individually, in cathodes of the prior art, the prior art has not been directed to providing dual mode cathodes of the type disclosed herein. In that regard, the prior art has not employed the specific combinations and ranges of materials utilized in the practice of the present invention, and cannot achieve the beneficial results obtained through the use of the present invention.

BRIEF DESCRIPTION OF THE INVENTION

Disclosed herein is a cathode material for a metal-oxygen battery. The material includes a first component which is present, on a weight basis, in an amount greater than 20% of the material, and ranges up to 80% of the material. The first component is an oxide or sulfide of a metal and is capable of intercalating lithium. The cathode includes a second component comprised of carbon. The second component is an electroactive catalyst which is capable of catalyzing the reduction of oxygen, and this component is present in the range of 10–80% by weight. The cathode includes a third component which is a binder, and this component is present, on a weight basis, in an amount of 5–40% of the cathode.

In specific embodiments of the invention, the first component comprises at least 30% of the cathode. In other embodiments, the carbon component of the cathode is present in an amount which is 10% or more, and no more than 30% of, the weight of the cathode. In particular embodiments of the invention, the second component is comprised of high surface area carbon such as carbon black. The binder typically comprises a fluoropolymer material. One preferred material for the first component of the cathode is $MnO_2$, and one specific cathode formulation comprises 41% $MnO_2$, 25% carbon black and 34% of a fluoropolymer binder.

Also disclosed herein is a battery which incorporates the cathode of the present invention.

DETAILED DESCRIPTION OF THE INVENTION

Figure 1:
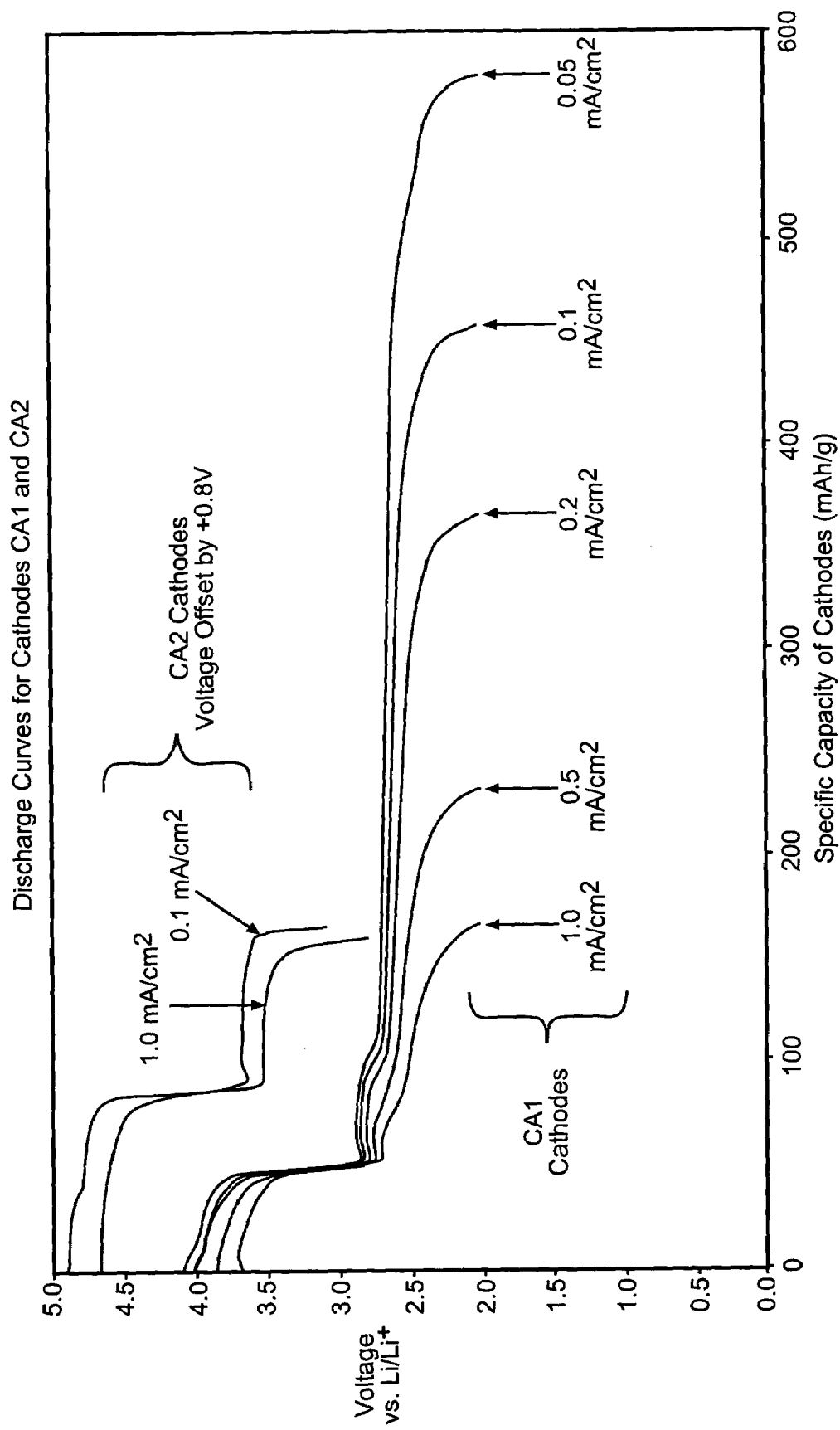
FIG. 1 is a graph showing the voltage versus specific capacity for a series of cells including the cathodes of the present invention, and cathodes of the prior art, at different discharge rates.

The present invention provides a cathode for a metal-oxygen battery having a dual mode of operation. As a result, the cathode provides for the fabrication of a battery having a high discharge rate and a high specific charge capacity. The cathode of the present invention will be described with reference to a lithium battery; however, it is to be understood that the principles of the present invention may be readily implemented in other battery systems.

The first component of the cathodes of the present invention comprises a material which is capable of intercalating a metal such as lithium. This component, in the case of a lithium battery, generally comprises an oxide or a sulfide of a metal, and in the operation of the battery, discharge occurs when lithium intercalates into the material. Generally, such materials have a crystalline or semi-crystalline lattice. The intercalation reaction is a fast process that allows the cathode to discharge at a high rate, and such discharge generally occurs at potentials ranging from 4.5 V to 2.0 V versus Li/Li+. Some materials which may be employed as the first component of the cathode comprise $MnO_2$ ($\lambda$, $\beta$ and $\gamma$ are some specific forms which may be employed), $CoO_2$, $NiO_2$, $LiCoO_2$, $LiMn_2O_4$, $LiNiO_2$, $MoS_2$, and $TiS_2$, taken either singly or in combination.

The first component is present in an amount which is greater than 20%, and ranges up to 80%, of the weight of the cathode. Unless otherwise noted herein, all percentages are stated on the basis of weight. In some embodiments, the first component comprises 20–60% of the cathode. In other specific embodiments, the first component comprises at least 30% of the weight of the cathode, and in one particular group of embodiments, the first component comprises 35–45% of the cathode.

The second component of the cathode is comprised of a material which is an electroactive catalyst capable of reducing oxygen from $O_2$ to $O_2^{-2}$ or $O^{-2}$. In particular, the second component comprises carbon, and high surface area carbon such as carbon black is a particular material which may be employed with advantage as this second component. In the operation of a lithium battery, the reduced oxygen reacts with lithium to form $Li_2O_2$ or $Li_2O$ that deposits on the surface of the carbon. High surface area carbon materials such as carbon blacks provide numerous sites for the deposition of the lithium oxides; hence, the capacity of the second component is quite large, and is typically on the order of 1500–2000 mAh/g, which compares to typical capacities on the order of 120–250 mAh/g for $MnO_2$ and like materials which operate on the basis of intercalation. It should be noted that various materials including $MnO_2$ do function as electrocatalysts for the reduction of oxygen; however, their contribution to the operation of the cathodes of the present invention is relatively small, since such materials typically have very small surface areas.

In general, the carbon comprising the second component is typically present in an amount of 10–80% of the weight of the cathode, and in one group of embodiments, it comprises 30–70% of the weight of the cathode. In one specific group of embodiments, the carbon component comprises less than 30% of the weight of the cathode, and in a specific group of compositions, the carbon component comprises 22–28% by weight of the cathode. In other specific embodiments, the second component comprises 50% of the weight of the cathode. There are a number of commercially available high surface carbon materials such as carbon black or acetylene black that may be employed in the practice of the present invention. Some specifically preferred commercial materials include products sold under the name Super P carbon black manufactured by MMM Carbon, Belgium; Shawinigan Black acetylene black manufactured by Chevron Phillips Chemical Company (SAB), and a product referred to as Black Pearls 2000 manufactured by the Cabot corporation. In some instances, mixtures of various carbon materials may be employed in the practice of the present invention.

The cathode of the present invention typically includes a binder which is a generally soft, inert, stable material which serves to bind the first and second components together. Fluoropolymers such as PTFE comprise one group of materials which may be used in the present invention. Products of this type are available under the trade name Teflon® and one material having utility in the present invention as a binder is Teflon® 30B. Polyvinylidene fluoride is another fluoropolymer having use as a binder in the present invention, such materials are sold under the trade name Kynar®, and one particular type of such material having utility in the present invention is Kynar® 2801. The binder is typically present in an amount of 5–40% of the weight of the cathode. If PTFE is the binder, one preferred range is 5–15%, with a specific embodiment including 10% PTFE. In those instances where the binder is polyvinylidene fluoride, it may be employed in an amount of 5–40% of the weight of the cathode. Non-fluorinated polymers such as polyethylene and polyolefins may also be employed as binders.

In order to fabricate the cathodes of the present invention, the first and second components are mixed, together with the binder, to form a homogeneous blend. Mixing may be carried out by various methods, depending upon the nature of the materials. If the first and second components are supplied as fine powders, simple mixing by processes such as stirring, shaking or blending will suffice. In some instances, the materials may be supplied in relatively large particulate size, and mixing may be advantageously accomplished by mechanically assisted processes such as ball milling, attritor milling or the like. Mixing may be carried out on dry blends, or an inert, relatively volatile solvent such as alcohol or water may be utilized to facilitate the mixing process. In those instances where the cathode is to be used in a non-aqueous environment, water-free solvents are preferred. Once the particulate materials have been thoroughly mixed, they may be compressed in a press, die, rolling mill or the like to produce a cathode structure. The bulk material may be pressed into a self-supporting structure, or a supporting substrate, such as a metal mesh, metal screen or the like may be employed as a base for the electrode material. It should be noted that in describing the percentage of materials comprising the cathodes of the present invention, the support substrate (if any) is not taken into consideration In order to illustrate the performance of the present invention, a series of lithium cells were prepared containing cathodes of the present invention. The cathode in each cell was comprised of a mixture of 41% $MnO_2$, 25% carbon (Super P) and 34% binder (Kynar® 2801). Cathodes were prepared by mixing $MnO_2$, Super P and Kynar® 2801 (ratio 41:25:34) in a blender cup dry for 1 minute. Acetone and dibutyl phthalate were added to create a slurry that could be coated onto a glass table. The mixture was blended for 10 minutes to achieve a smooth consistency. The slurry was coated on a glass table to a dry thickness of 0.011". The dried cathodes were cut into 5 $cm^2$ sections and heat laminated onto aluminum grids. The dibutyl phthalate is removed by extracting the laminated cathode three times in dry methanol. The laminated cathodes were dried under vacuum for 2 hours at 105° C. before use. The laminated cathodes were assembled into cells by placing a dried cathode on a polypropylene block. A non-woven polypropylene separator was placed on top of the cathode. The separator is a product made by Hollingsworth & Vose, designated BMP07010. A lithium anode supported on nickel grid is placed on the separator and another polypropylene block is placed on top of this. The whole assembly is held together by three wire ties wrapped around the polypropylene blocks. The assembly is placed in a foil laminate pouch so that the anode and cathode leads extend outside the top of the pouch then the pouch is sealed over the leads. 6 $cm^3$ of an electrolyte comprised of 1M $LiPF_6$ in PC:DME (1:1 wt/wt) and 75 $cm^3$ of pure oxygen is added to the pouch and the pouch is then sealed. The pouch is made from an aluminum/polymer laminate produced by Shield Pack Inc. and designated as Class PPD packaging. The cell was then ready for discharge testing.

A similar group of cells were prepared incorporating cathodes of the present invention. These cathodes were comprised of 70% $MnO_2$, 7.5% carbon (Super P) and 22.5% binder (Kynar® 2801).

The performance characteristics of the two groups of cells were compared, and in that regard, FIG. 1 shows the voltage versus specific capacity of the cathode for the various cells. In FIG. 1, the specific capacity of the cathode is given in terms of milliamp hours per gram of cathode material. In FIG. 1, the cathodes of the present invention are designed "CA1" and the cathodes of the prior art are designated "CA2". The specific capacity versus voltage curves of the cathodes of the present invention were measured at current densities ranging from 0.05 $mA/cm^2$ up to 1.0 $mA/cm^2$, while the characteristics of the cells employing prior art cathodes were measured at 0.1 $mA/cm^2$ and 1.0 $mA/cm^2$. As will be seen, the cells which incorporate the cathodes of the present invention provide a greatly increased specific capacity.

Figure 2:
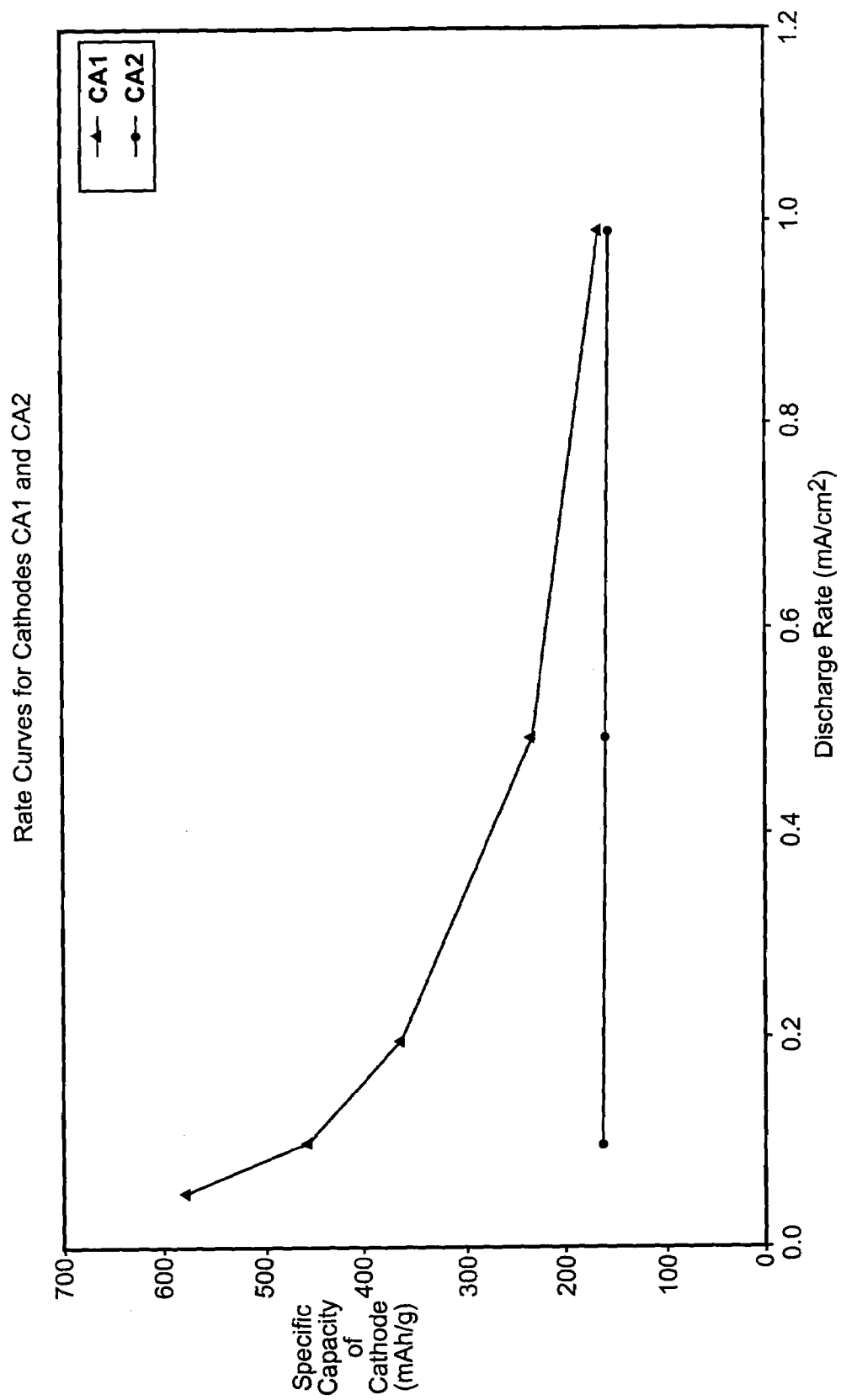
FIG. 2 is a graph showing the specific capacity of cathodes of the present invention and cathodes of the prior art, as a function of discharge rate.

In a second experimental series, specific capacity of the cathodes of the present invention and those of the prior art were measured as a function of discharge rates of the cells in which they were incorporated. This data is summarized in the graph of FIG. 2, and it will be seen from this figure that the cells incorporating cathodes of the present invention provide a significantly higher capacity than do those of the prior art at slow and moderate discharge rates, and still provide improved specific capacity at high discharge rates. As will be seen from FIGS. 1 and 2, the dual mode cathodes of the present invention significantly enhance the performance of the lithium cells. The cathode technology of the present invention may be readily implemented in connection with conventional processing and manufacturing techniques, and confer significant advantage upon the art.

While in the foregoing discussion the invention has been described with particular reference to lithium batteries, it is to be understood that it may likewise be adapted to other metal-oxygen battery systems including zinc, iron, aluminum, magnesium and other such systems. In view of the teaching presented herein, other modifications and variations of the present invention will be readily apparent to one of skill in the art. The foregoing drawings, discussion and description are illustrative of particular embodiments of the invention but are not meant to be limitations upon the practice thereof. It is the following claims, including all equivalents, which define the scope of the invention.

The invention claimed is:

1. A cathode material for a lithium battery, said cathode material comprising, on a weight basis:
   a first component which is an oxide or a sulfide of a metal, said first component being capable of intercalating lithium, said first component being present in an amount which is equal to or greater than 35%, and up to 45%;
   a second component which comprises carbon, said second component being an electroactive catalyst which is capable of reducing oxygen, said second component being present in an amount of 22–28%; and
   a binder which is present in an amount of 30–40%.

2. The cathode material of claim 1, wherein said first component is selected from the group consisting of: $MnO_2$, $CoO_2$, $NiO_2$, $LiCoO_2$, $LiMn_2O_4$, $LiNiO_2$, $MoS_2$, $TiS_2$, and combinations thereof.

3. The cathode material of claim 1, wherein said second component comprises high surface area carbon.

4. The cathode material of claim 3, wherein said high surface area carbon comprises carbon black.

5. The cathode material of claim 1, wherein said binder comprises a fluoropolymer.

6. The cathode material of claim 1, wherein said first component comprises $MnO_2$.

7. The cathode material of claim 1, wherein said first component comprises 35–45% $MnO_2$, said second component comprises 22–28% carbon, and said binder comprises 30–40% of a fluoropolymer.

8. The cathode material of claim 1, wherein said first component comprises 41% $MnO_2$, said second component comprises 25% carbon black, and said third component comprises 34% of a fluoropolymer.

9. A cathode material for a lithium battery, said cathode material comprising, on a weight basis:
   a first component comprising 40% $MnO_2$;
   a second component comprising 50% carbon black; and
   a third component comprising 10% polytetrafluoroethylene.

10. The cathode material of claim 1, wherein said first component comprises 35–45% of $TiS_2$ said second component comprises 22–28% carbon, and said binder comprises 30–40% of a fluoropolymer.

11. A lithium buttery which includes the cathode material of claim 1.

12. A cathode material for a metal-air battery, said cathode material comprising, on a weight basis:
   a first component which is capable of intercalating a metal, said first component being present in an amount which is equal to or greater than 35%, and up to 45% of said material;
   a second component which comprises an electroactive catalyst which is capable of catalyzing the reduction of oxygen, said second component comprises 22–28% of said material; and
   a binder comprising 30–40% of said material.

13. The cathode material of claim 1, wherein said first component comprises 35–45% of $MoS_2$, said second component comprises 22–28% carbon, and said binder comprises 30–40% of a fluoropolymer.

* * * * *